United States Patent [19]

Adelmann et al.

[11] 4,048,133

[45] Sept. 13, 1977

[54] GLASS FIBER-REINFORCED THERMOPLASTIC POLYCARBONATE MOLDING COMPOSITIONS WITH IMPROVED TOUGH-ELASTIC PROPERTIES

[75] Inventors: Siegfried Adelmann; Dieter Margotte, both of Krefeld; Josef Merten, Korschenbroich, all of Germany

[73] Assignee: Bayer Aktiengesellschaft, Leverkusen, Germany

[21] Appl. No.: 702,549

[22] Filed: July 6, 1976

Related U.S. Application Data

[63] Continuation-in-part of Ser. No. 584,553, June 6, 1975, abandoned.

[30] Foreign Application Priority Data

June 21, 1974 Germany .............................. 2429816

[51] Int. Cl.$^2$ ...................... C08E 63/62; C08G 65/00; C08L 69/00
[52] U.S. Cl. ........................... 260/37 PC; 260/47 ET; 260/47 XA; 260/823
[58] Field of Search ........ 260/37 PC, 47 ET, 47 XA, 260/823

[56] References Cited

U.S. PATENT DOCUMENTS

| | | | |
|---|---|---|---|
| 3,221,080 | 11/1965 | Fox | 428/379 |
| 3,365,517 | 1/1968 | Barth | 260/823 |
| 3,437,632 | 4/1969 | Hechelhammer et al. | 260/37 PC |
| 3,652,710 | 3/1972 | Holub | 260/823 |
| 3,748,303 | 7/1973 | Becker et al. | 260/47 XA |
| 3,763,088 | 10/1973 | Izawa et al. | 260/37 PC |
| 3,875,107 | 4/1975 | Nouvertne et al. | 260/37 PC |

FOREIGN PATENT DOCUMENTS 1,234,122   6/1971   United Kingdom

Primary Examiner—Melvyn I. Marquis
Assistant Examiner—H. H. Fletcher
Attorney, Agent, or Firm—Gene Harsh; Lawrence S. Pope; Frederick H. Colen

[57] ABSTRACT

The present invention relates to glass fiber reinforced thermoplastic polycarbonate molding compositions whose toughness and elastic properties have been improved by the incorporation of 1 to 5 wt.% of poly-(2,6-dialkyl-1,4-phenyleneoxide). These compositions contain between 10 and 30 wt.% glass fibers and display improved properties even after extended times at high humidity. The polyphenylene oxides preferably have $\overline{M}_w$ between 2,000 and 100,000, most preferably 20,000 and 60,000. A particularly suitable additive is poly-(2,6-dimethyl-1,4-phenylene oxide).

5 Claims, No Drawings

GLASS FIBER-REINFORCED THERMOPLASTIC POLYCARBONATE MOLDING COMPOSITIONS WITH IMPROVED TOUGH-ELASTIC PROPERTIES

This application is a continuation-in-part of application Ser. No. 584,553, filed on June 6, 1975 and now abandoned.

SUMMARY OF THE INVENTION

The present invention relates to polycarbonate molding compositions based on high molecular, thermoplastic aromatic polycarbonates containing 10–30% by weight of glass fibers (relative to the total weight of polycarbonate + glass fibers) and containing 1–5% by weight of poly-(2,6-dialkyl-1,4-phenylene oxide) (relative to the weight of glass fibers).

BACKGROUND OF THE INVENTION

It is known that the strength and stiffness of thermoplastics can be increased by incorporation of glass fibers. A detailed description of this technology is described in the monograph by P. H. Selden "Glasfaserverstärkte Kunststoffe" ("Glass Fiber-Reinforced Plastics"), Springer-Verlag (1967), pages 307–344.

High molecular, thermoplastic aromatic polycarbonates are distinguished particularly by their good mechanical, thermal and electrical properties. In comparison thereto, glass fiber-reinforced, high molecular, thermoplastic aromatic polycarbonates have both substantially increased flexural strength and stiffness, and a substantially increased E-modulus. On the other hand, the impact strength, notched impact strength and elongation at break of glass fiber-reinforced polycarbonates are less than those of corresponding non-reinforced polycarbonates. The efforts, in the preparation of glass fiber-reinforced polycarbonates, are now aimed at increasing the adhesion between the fibers and the polycarbonate matrix by using glass fibers with suitable glass fiber sizing agents as well as additives and/or adhesion promoters, in order thereby to improve the tough-elastic properties of glass fiber-reinforced polycarbonate molding compositions, particularly also under damp climatic conditions.

DETAILED DESCRIPTION OF THE INVENTION

The present invention provides glass fiber-reinforced polycarbonate molding compositions which are distinguished by an improvement in the tough-elastic properties, especially under damp climatic conditions. This effect results from the use, according to the invention, of polyhenylene oxide as an additive to the glass fiber-reinforced polycarbonate molding compositions. The effect proves particularly advantageous in the case of utensils which are exposed to high atmospheric humidity. Thus, for example, an aromatic polycarbonate, reinforced with 20% by weight of glass fibers, and containing 5% by weight of polyphenylene oxide (based on the glass fibers) has an impact strength, after 20 days' climatically controlled storage at 40° C and 96% relative atmospheric humidity, which is still distinctly above that of a comparison sample which has not been stored under these climatic conditions and does not contain polyphenylene oxide. Furthermore, the advantages described are achieved without losing the other desired properties of the glass fiber-reinforced polycarbonate molding compositions (for example flexural strenght, E-modulus and the like).

Poly-(2,6-dialkyl-1,4-phenylene oxides) to be used according to the invention have weight average molecular weights $\overline{M}_w$ (measured by the light scattering method in chloroform) which are between 2000 and 100,000 preferably between 20,000 and 60,000 and which are obtained in accordance with known processes by oxidative condensation of 2,6-dialkylphenols with oxygen in the presence of catalyst combinations of copper salts and tertiary amines. (See, for example, DT-OS (German Published Specification) 2,126,434 and U.S. Pat. No. 3,306,875).

Suitable poly-(2,6-dialkyl-1,4-phenylene oxides) are the poly-[2,6-di($C_1$–$C_4$-alkyl)-1,4-phenylene oxides], such as, for example, poly-(2,6-dimethyl-1,4-phenylene oxide).

Suitable 2,6-dialkylphenols for the preparation of the poly-[(2,6-dialkyl)-1,4-phenylene oxides] are those with $C_1$–$C_4$-alkyl substituents, such as for example, 2,6-dimethyl-phenol, 2-methyl-6-ethylphenol, 2,6-diethyl-phenol, 2-ethyl-6-n-propylphenol, 2-methyl-6-isopropylphenol, 2-methyl-6-n-propylphenol, 2-methyl-6-butylphenol and 2,6-di-n-propylphenol.

Suitable catalyst combinations for the preparation of the polyphenylene oxides are copper (I) chloride and triethylamine, copper (I) sulphate and tributylamine, copper (I) acetate and N-methylmorpholine and copper (I) chloride and pyridine.

The following is an example of a suitable process for the preparation of poly-(2,6-dialkyl-1,4phenylene oxides), using copper (I) chloride/pyridine as the catalyst combination, according to DT-OS (German Published Specification) No. 2,126,434 respectively according U.S. Pat. No. 3 789 054: a 2,6-dialkyl-phenol is dissolved in a mixture of n-butanol and toluene and subjected to oxidative-dehydrogenating condensation in the presence of the copper (I) chloride/pyridine complex while supplying oxygen. The polyhenylene oxide which has precipitated is subsequently reprecipitated in chloroform/methanol.

High molecular, thermoplastic, aromatic polycarbonates in the sense of the invention are the polycondensates obtainable by reaction of aromatic dihydroxy compounds, especially of dihydroxydiarylalkanes, with phosgene or diesters of carbonic acid, suitable dihydroxy compounds being not only the unsubstituted dihydroxydiarylalkanes but also those in which the aryl radicals carry methyl groups or halogen atoms in the o- and/or m-position relative to the hydroxyl group. Branched polycarbonates are also suitable. The polycarbonates have average molecular weights $\overline{M}_w$ of between 10,000 and 100,000 preferably between 20,000 and 40,000.

Examples of suitable aromatic dihydroxy compounds are hydroquinone, resorcinol, 4,4'-dihydroxydiphenyl, bis-(hydroxy-phenyl)-alkanes, such as for example, $C_1$–$C_8$-alkylene- and $C_2$–$C_8$-alkylidene-bisphenols, bis-(hydroxyphenyl)-cycloalkanes, such as, for example $C_5$–$C_6$-cycloalkylene- and $C_5$–$C_6$-cycloalkylidene-bisphenols, bis-(hydroxy-phenyl)-sulphides, -ethers, -ketones, -sulphoxides or -sulphones, and also α,α'-bis-(hydroxyphenyl)-diisopropylbenzene and the corresponding nuclear-alkylated and nuclear-halogenated compounds. Preferred polycarbonates are based on bis-(4-hydroxy-phenyl)-propane-2,2 (bispenol A), bis-(4-hydroxy-3,5-dichloro-phenyl)-propane-2,2 (tetrachlorobisphenol A), bis-(4-hydroxy-3,5-dibromophenyl)-propane-2,2 (tetrabromobisphenol A), bis-(4-hydroxy-3,5-dimethyl-phenyl)-propane-2,2 (tetramethylbisphenol A), bis-(4-hydroxyl-phenyl)-cyclohexane-1,1 (bisphenol Z) and on trinuclear bisphenols such as α,α'-bis-(4-hydroxyphenol)-p-diisopropylbenzene.

Further aromatic dihydroxy compounds suitable for the preparation of polycarbonates are described in U.S. Pats. Nos. 3,028,365; 2,999,835; 3,148,172; 3,271,368; 2,970,131; 2,991,273; 3,271,367; 3,280,078; 3,014,891 and 2,999,846.

Glass fibers which can be used to prepare the molding compositions are for example, fibers of low-alkali aluminum-borosilicate glass having a maximum alkali metal oxide content of 0.8% by weight (E-glass), of diameter between 8–15μ and length between 150 and 300μ (short glass fibers) or 3,000 to 6,000μ (chopped strands), as well as rovings.

To prepare the molding compositions according to the invention, the individual components are mixed in known mixing devices. Examples of suitable mixing devices are kneaders, single-screw extruders, twin-screw extruders, mills and the like. Either the aromatic polycarbonates are first mixed, and fused, with the polyphenylene oxide and the glass fibers being subsequently introduced into the melt in a known manner, or the starting components are mixed, and extruded, conjointly. During the mixing process it is possible, to also admix additives such as pigments, dyestuffs, stabilizers, flameproofing agents, flow agents, lubricants, mold release agents and antistatic agents, in a known manner.

The glass fiber-reinforced thermoplastic polycarbonate molding compositions according to the invention are applied wherever moldings, particularly under damp climatic conditions, have to meet high standards with regard to their tough-elastic behavior, such as impact strength and elongation at break, and where, in addition, stiffness, great dimensional stability, a high heat distortion point, high continuous use temperatures, good dimensional accuracy and good electrical properties of the moldings are demanded. This applies preferentially for uses in the electrical industry and in the optical field, for example, for components of switch cabinets, socket strips, bobbins, chassis and housing components of all kinds, binoculars and the like.

The following starting materials were used to prepare the molding compositions according to the invention:

I. Preparation of a poly-(2,6-dialkyl-1,4-phenylene oxide).

Poly-(2,6-dimethyl-1,4-phenylene oxide) prepared according to DT-OS 2,126,434:

8 kg of 2,6-dimethylphenol were dissolved in a solution of 30 1 of n-butanol, 10 1 of toluene, 4 kg of pyridine and 100 g of copper-I chloride. 2,6-dimethylphenol is condensed by oxidative dehydrogenation to poly-(2,6-dimethyl-1,4-phenylene oxide) by supplying 50 1 of oxygen/min over the course of 6 hours. At the start of the introduction of the oxygen, the temperature rises greatly. A temperature rise above 55° C during the first phase of the reaction is avoided by cooling. After 2 to 3 hours the polyphenylene oxide begins to precipitate. After supplying oxygen for approximately 3 hours longer, the PPO is filtered off, washed free from pyridine by means of methanol containing hydrogen chloride, and reprecipitated from chloroform/methanol. A pale yellow colored powder is obtained. The viscosity $\eta_{rel}$ is 1.2 ($\eta_{rel}$ measured at 25° C in methylene chloride at a concentration of 5 g/l) and the molecular weight is about 60,000.

II. Preparation of a Polycarbonate.

Approximately 454 parts of 4,4'-dihydroxydiphenyl-2,2'-propane and 9.5 parts of p-tert.-butylphenol are suspended in 1.5 1 of water. The oxygen is removed from the reaction mixture, in a 3-necked flask equipped with a stirrer and gas inlet tube, by passing nitrogen through the reaction mixture for 15 minutes, while stirring. 355 parts of 45% strength sodium hydroxide solution and 1000 parts of methylene chloride are then added. The mixture is cooled to 25° C. While maintaining this temperature by cooling, 237 parts of phosgene are added over a period of 120 minutes. An additional amount of 75 parts of a 45% strength sodium hydroxide solution is added after 15–30 minutes, or after the phosgene up-take has started. 1.6 parts of triethylamine are added to the resulting solution and the mixture is stirred for a further 15 minutes. A highly viscous solution is obtained, the viscosity of which is regulated by adding methylene chloride. The aqueous phase is separated off. The organic phase is washed with water until free from salt and alkali. The polycarbonate is isolated from the washed solution, and dried. It has a relative viscosity of 1.29–1.30 measured in an 0.5% strength methylene chloride solution at 20°. This corresponds approximately to a molecular weight of 32,000. The polycarbonate thus obtained is extruded and granulated.

I. Poly-(2,6-dimethyl-1,4-phenylene oxides) obtained in accordance with the above instruction from 2,6-dimethylphenol by oxidative coupling:

A. $\eta_{rel} = 1.10$ $M_{LS} = 20,000$
B. $\eta_{rel} = 1.16$ $M_{LS} = 40,000$
C. $\eta_{rel} = 1.21$ $M_{LS} = 60,000$ ($\eta_{rel}$ measured at 25° C in methylene chloride, at a concentration of 5 g/l; $M_{LS}$ = molecular weight as determined by light scattering).

II. Polycarbonates obtained in accordance with the above-instruction by the phase boundary process:

D. Polycarbonate based on 4,4'-dihydroxy-diphenylpropane-2,2
$\eta_{rel} = 1.30$ $M_{LS} = 30,000$.

E. Co-polycarbonate based on 90mol % of bisphenol A and 10 mol % of 3,5,3',5'-tetrabromo-4,4'-dihydroxydiphenylpropane-2,2
$\eta_{rel} = 1.33$ $M_{LS} = 37,000$.

F. Co-polycarbonate based on 70 mol % of bisphenol A and 30 mol % of 3,5,3',5'-tetramethyl-4,4'-dihydroxydiphenylpropane-2,2
$\eta_{rel} = 1.28$ $M_{LS} = 30,000$.

($\eta_{rel}$ measured at 25° C, at a concentration of 5 g/l in methylene chloride: $M_{LS}$ = molecular weight as determined by light scattering).

III. Glass fibers (E-glass)

G. Short glass fibers, average fiber lenght 250μ, diameter 10μ.

H. Chopped strands, average fiber length 4500μ, diameter 10μ.

The examples which follow are intended to illustrate the subject of the invention. The most important mechanical properties are listed in the table which follows.

EXAMPLE 1 (COMPARISON EXAMPLE)

8 kg of polycarbonate D are fused in a twin-screw extruder at 310° C. After adding 2 kg of short glass fibers G to the polycarbonate melt, the polymer ribbon is drawn off and granulated.

EXAMPLE 2

8 kg of polycarbonate D and 20 g of polyphenylene oxide A are fused in a twin-screw extruder at 310° C. After adding 2 kg of short glass fibers G to the polycarbonate melt, the polymer ribbon is drawn off and granulated. EXAMPLE 3 (COMPARISON EXAMPLE)

8 kg of polycarbonate D are mixed with 2 kg of chopped strands H, as described in Example 1, and the mixture is extruded at 310° C.

EXAMPLE 4

8 kg of polycarbonate D are mixed with 20 g of polyphenylene oxide B and the mixture is fused in a twin-screw extruder at 310° C. After adding 2 kg of chopped strands H to the polycarbonate melt, the polymer ribbon is drawn off and granulated.

EXAMPLE 5

8 kg of polycarbonate D are mixed with 60 g of a polyphenylene oxide B and the mixture is fused in a twin-screw extruder at 310° C. After adding 2 kg of chopped strands H to the polycarbonate melt, the polymer ribbon is drawn off and granulated.

EXAMPLE 6

8 kg of polycarbonate D are mixed with 100 g of a polyphenylene oxide B and the mixture is fused in a twin-screw extruder at 310° C. After adding 2 kg of chopped strands H to the polycarbonate melt, the polymer ribbon is drawn off and granulated.

EXAMPLE 7 (COMPARISON EXAMPLE)

9 kg of polycarbonate E are mixed with 1 kg of short glass fibers G in a twin-screw extruder at 310° C and the product is drawn off and granulated.

EXAMPLE 8

9 kg of polycarbonate E are mixed with 50 g of a polyphenylene oxide C and the mixture is fused in a twin-screw extruder at 310° C. After adding 1 kg of short glass fibers G to the polycarbonate melt, the polymer ribbon is drawn off and granulated.

EXAMPLE 9 (COMPARISON EXAMPLE)

7 kg of aromatic polycarbonate F are mixed with 3 kg of short glass fibers G in a twin-screw extruder at 300° C.

EXAMPLE 10

7 kg of aromatic polycarbonate F are mixed with 100 g of a polyphenylene oxide C and the mixture is fused in a twin-screw extruder at 310° C. After adding 3 kg of short glass fibers G to the polycarbonate melt, the polymer ribbon is drawn off and granulated.

TABLE

| Molding Compositions from Example | Test Method DIN*) | Comparison 1 | 2 | Comparison 3 | 4 | 5 | 6 | Comparison 7 | 8 | Comparison 9 | 10 |
|---|---|---|---|---|---|---|---|---|---|---|---|
| $\eta_{rel}$ after injection molding | | 1.30 | 1.30 | 1.32 | 1.32 | 1.31 | 1.30 | 1.33 | 1.31 | 1.22 | 1.22 |
| Flexural strength kp/cm$^2$ | 53,452 | 1,600 | 1,580 | 1,650 | 1,640 | 1,620 | 1,630 | 1,400 | 1,380 | 1,760 | 1,800 |
| Impact strength cmkp/cm$^2$ | 53,453 | 45 | 58 | 48 | 58 | 63 | 65 | 56 | 72 | 36 | 54 |
| Notched Impact strength cmkp/cm$^2$ | 53 453 | 12 | 13 | 13 | 13 | 12 | 11 | 18 | 18 | 9 | 11 |
| Elongation at break % | 53,455 | 3.7 | 5.1 | 3.6 | 5.8 | 5.8 | 6.1 | 10 | 18 | 4.1 | 5.9 |
| E-modulus kp/cm$^2$ | 53,455 | 54,500 | 54,000 | 58,100 | 56,000 | 54,500 | 53,000 | 40,000 | 35,400 | 50,000 | 57,000 |
| Vicat B ° C | 53,460 | 154 | 153 | 153 | 152 | 153 | 153 | 150 | 149 | 156 | 155 |
| Impact strength after climatically controlled storage at 40° C, 96% relative humidity: cmkp/cm$^2$ | | | | | | | | | | | |
| 0 days | | | | 48 | | | | | 65 | | |
| 2 days | | | | 44 | | | | | 62 | | |
| 5 days | | | | 42 | | | | | 60 | | |
| 10 days | | | | 39 | | | | | 54 | | |
| 20 days | | | | 37 | | | | | 52 | | |

*) DIN 53 452 is comparable with ASTM D-790, DIN 53 455 is comparable with ASTM D-638, DIN 53 460 is comparable to ASTM D-1525, DIN 53 453 is comparable with ASTM D 256.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims. What is claimed is:

1. Polycarbonate molding compositions based on high molecular thermoplastic aromatic polycarbonates containing 10–30% by weight of glass fibers (relative to the total weight of polycarbonate + glass fibers) and containing 1–5% by weight of poly-(256-dialkyl-1,4-phenylene oxide) (relative to the weight of glass fibers).

2. Polycarbonate molding compositions according to claim 1, wherein they contain poly-(2,6-dimethyl-1,4-phenylene oxide).

3. Polycarbonate molding compositions according to claim 1, wherein poly-(2,6-dialkyl-1,4-phenylene oxides) with $\overline{M}_w$ between 2000 and 100,000 are employed.

4. Polycarbonate molding compositions according to claim 3 wherein the poly-(2,6-dialkyl-1,4-phenylene oxides) have $\overline{M}_w$ between 20,000 and 60,000 and the polycarbonate have $\overline{M}_w$ between 10,000 and 100,000.

5. Polycarbonate molding compositions according to claim 4 wherein the glass fibers are low alkali aluminum-borosilicate glass having a maximum alkali metal content of 0.8 wt.%, a diameter of 8–15$\mu$ and a length of either 150 to 300$\mu$ or 3600 to 6000$\mu$.

* * * * *